United States Patent [19]

Li et al.

[11] Patent Number: 5,163,334

[45] Date of Patent: Nov. 17, 1992

[54] CIRCULAR SAW TESTING TECHNIQUE

[75] Inventors: Cheng-Jih Li, Leominster; Louis Alberghini, Berlin, both of Mass.

[73] Assignee: Simonds Industries Inc., Fitchburg, Mass.

[21] Appl. No.: 602,747

[22] Filed: Oct. 24, 1990

[51] Int. Cl.$^5$ .................... G01H 13/00; G01H 17/00; G01M 7/00
[52] U.S. Cl. ...................... 73/865.9; 73/579
[58] Field of Search ................. 73/865.9, 579

[56] References Cited

U.S. PATENT DOCUMENTS

| | | | |
|---|---|---|---|
| 3,190,125 | 6/1965 | Holz | 73/865.9 |
| 3,460,841 | 8/1969 | Caldwell | 73/865.9 |
| 4,482,859 | 11/1984 | Fournier | 73/579 |
| 4,751,657 | 6/1988 | Imam et al. | 73/577 |
| 5,046,362 | 9/1991 | Strubbe | 73/579 |

FOREIGN PATENT DOCUMENTS

| | | | |
|---|---|---|---|
| 0600409 | 3/1978 | U.S.S.R. | 73/865.9 |
| 1573368 | 6/1990 | U.S.S.R. | 73/579 |

OTHER PUBLICATIONS

R. Szymani and Rhemrev Article, (Undated—Source Unknown).
Instruction Document—The Efficient Saw Mill, (1957—Simonds Cutting Tools).
Project Report: Saw Blade "Tensioning" and Truing (1984—Franklin Institute Research Laboratory, Inc.)
G. S. Schajer Article, (Undated—Forst Industries-World Wood).
G. S. Schajer—Technical Report 35.01.130 (Progress Report, 1979).
M. C. Leu and C. D. Mote, Jr.—Article (Undated—ASME, 82-WA/NCA-2).
Tension in Saws—Theory of Stresses—Chapter 5, Undated—Text Unknown).
Procedure For Inspection of Blocked Condition, etc. (Undated—Author and Source Unknown).
On-Line Saw Stability Using Electromagnets, (Undated—Source Unknown).

Primary Examiner—Hezron E. Williams
Assistant Examiner—George M. Dombroske
Attorney, Agent, or Firm—Robert F. O'Connell

[57] ABSTRACT

A method for testing circular saws in which a saw to be tested is mounted for rotation at a controllable speed, a sensor being mounted opposite a surface thereof for determining the distance from the sensor to the surface. The sensor is appropriately calibrated and, when the saw is rotated at selected speeds, the output signal from the sensor is processed so as to provide a time domain response waveform and a frequency domain response waveform therefrom at the selected speeds of rotation. Certain characteristics of the saw's operation, such as the presence of low frequency "wobble" components, the width of the cutting operation, the perpendicularity of the cutting plane of the saw relative to the axis of rotation, and the development, or flatness, of the saw, are determined from the time domain and frequency domain responses.

8 Claims, 5 Drawing Sheets

CIRCULAR SAW TESTING TECHNIQUE

INTRODUCTION

This invention relates generally to techniques for testing product characteristics and, more particularly, to techniques for testing the characteristics of saws, such as rotating circular saws.

BACKGROUND OF THE INVENTION

It is desirable to test circular saws at the point of manufacture, for example, in order to avoid the sale and delivery of saws having characteristics which are unacceptable for their intended operation, or at the point of use in order to determine if previously acceptable characterstics thereof have been retained over the period of time. Further, even for saws acceptable for sale and use, it is desirable to retain an historical record of the characteristics thereof for future reference as, for example, to compare a particular saw's characteristics over time or to provide information for a statistical analysis of the charactertistics of a large number of different saws for future design reference purposes.

It is, of course, desirable that saws during operation cut in a narrow straight line with minimal, ideally zero, deviation from a cutting plane. Such deviations can arise if the overall saw blade is not perfectly flat, i.e., the saw blade curves out of an ideal flat plane, a condition sometimes referred to as "cupping" or "dishing" because of the shape the saw blade assumes during rotation. When the saw blade is substantially flat, i.e., all portions thereof lie in the cutting plane during rotation, particularly at the saw's design operating speed, the saw is said to be fully "developed".

A further problem arises when the saw blade during operation moves at a relatively slow rate in a lateral, or side-to-side, direction about the desired cutting plane, such movement often being referred to as a "wobble". It is desirable to minimize the amplitude of the wobble so that the cut deviates as little as possible from the desired cutting plane, that is a straight cut occurs. Further, it is desirable that the cutting plane of the saw blade be maintained perpendicular to the axis of rotation during operation. Moreover, it is desirable that relatively high frequency excursions of the cutting edge about the cutting line be minimized so that the width of the cut is minimized. It is helpful, therefore, to test certain saw blade characteristics under various conditions in order to predict the extent to which a saw will avoid such problems during operation.

One characteristic that has been used by those in the art for such purpose has been the wobble that exists at a relativley low speed of rotation. In accordance therewith, a contact sensor, such as a position gauge, is placed against the lateral surface of the saw, usually near the cutting edge thereof, and the movement of the dial of the gauge is observed so as to determine the lateral movement of the surface about a mean, or reference, value as the saw is relatively slowly rotated manually on a test spindle. While such visual inspection process may provide some indication of the wobble and to some extent the flatness of the saw blade at such rotating speed, such a technique does not provide a sufficiently accurate tracking of such movement so as to effectively predict the operation of the saw at the operating speed of rotation during use.

It is desirable to provide better testing procedures which significantly improve the ability to establish suitable criteria for a saw's operating characteristics, as well as to determine such characteristics for particular saws for comparison with such criteria. Such testing procedures would permit a more accurate prediction of the saw's potential adequacy of performance during use so that saws not satisfying such criteria can be suitably detected and the saw either reworked or rejected before sale and delivery to a customer or so that the performance of saws already in use can be periodically rechecked.

BRIEF SUMMARY OF THE INVENTION

In accordance with the invention a testing technique has been devised for more accurately testing circular saws in a manner which provides better information as to a saw's performance characteristics and, hence, its acceptability for initial or continued use, as well as providing an historical record of such performance characteristics. In accordance therewith, a sensor, preferably a non-contact sensor, is positioned at a suitable location near one side of a saw blade which has been mounted for rotation on a test spindle which can be rotated at a controlled speed. The sensor provides a time-varying sensed output signal, e.g. a voltage signal, representative of the distance from the sensor head to the lateral surface of the saw blade. Variations in such distance about a calibrated reference, or mean, distance represent the lateral movement of the blade surface, such variations being determined under various conditions.

The sensed output signal is suitably digitized and conditioned for supply to a data processing system which can provide both a time domain response waveform of the sensor output and a frequency domain response waveform of the sensor output for analysis, under static and dynamic conditions. The time domain response, for example, provides information representing the excursion amplitude of the lateral motion present, sometimes referred to as the "run-out," which information indicates whether such lateral motion exceeds a desired deviation from a mean value under either static or dynamic conditions. Further such time domain response provides an indication of changes in the mean value as the speed of rotation varies, such information indicating the degree to which the overall saw blade deviates from a desired flatness, particularly at or near its operating speed, i.e., the "development" of the saw blade.

The frequency domain response provides information as to the principal lateral vibration frequencies of the blade at various operating speeds so as to indicate the degree of wobble that occurs at such speeds, as well as providing information as to the natural, or resonant, frequency, or frequencies, of the blade so that operation at such natural frequencies can be avoided. Other useful information for predicting a saw's performance characteristics can also be generated from the testing procedures of the invention, as discussed in more detail below.

DESCRIPTION OF THE INVENTION

The invention can be described in more detail with the help of the accompanying drawings wherein.

Figure 1:
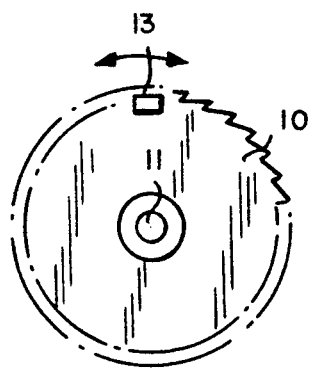
FIG. 1 shows a side view of a saw blade and a sensor positioned adjacent thereto.
Figure 2:
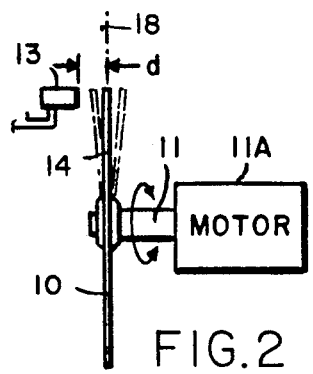
FIG. 2 shows an end view of the saw blade and sensor of FIG. 1.

As can be seen in FIGS. 1 and 2, for example, a saw blade 10 is positioned on a test spindle 11 which permits the blade to be rotated by a motor 11A at a controlled speed of rotation in either direction as shown by arrow 12, for example. A sensing element 13 is suitably positioned at one side of the saw blade for measuring the distance "d" from the sensor head to the surface 14 of the blade 10. A reference distance, e.g. $d_o$, is determined, which distance is such that, when the sensor is suitably calibrated, a reference output signal having a known reference output value, e.g. a known voltage output value, is produced therefrom. Such reference distance, for example, represents the distance to the desired cutting plane 18 of the saw blade during operation. Accordingly, as the saw blade rotates, the lateral distance "d" may vary about such reference distance "$d_o$" (as shown in an exaggerated manner by the dashed lines). As the blade's lateral motion varies, the sensed output amplitude varies as a function of time, tending in most cases to represent generally, although not necessarily exactly, a sine-wave variation. The sensor may be of any suitable type for measuring the distance d to the saw blade surface, such as a laser distance measuring device, a proximity sensing element, an optical distance measuring device or an inductive or capacitance sensing element. Such devices are well-known and their use in the context of the invention would be clear to those in the art.

Figure 3:
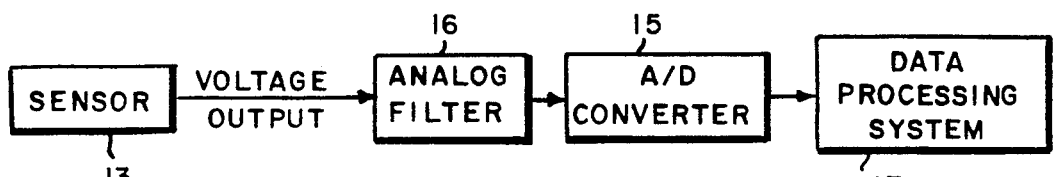
FIG. 3 shows a block diagram of a system for testing the saw blade of FIGS. 1 and 2 in accordance with the invention.

As seen in the block diagram of FIG. 3, the time-varying voltage analog output signal from a sensor 13 is suitably filtered by an analog filter 15 and then digitized, as by an analog to digital (A/D) converter 16. The filtering operation is preferably performed by a low pass filter circuit and appropriately conditions the analog signal to pass only analog signal components below a selected frequency. Such a filter removes higher frequency components including undesirable high frequency noise components, e.g., large noise "spikes" or other relatively large high frequency transient signal components therein. Such transient components may arise, for example, due to minor imperfections in the saw's surface or due to electronic noise in the sensing system. Alternatively, the analog signal may be conditioned by initially digitizing the analog signal and using a digital filter circuit thereafter for such purpose or by the use of suitable software techniques used in the data processing system for appropriately processing the digitized signal for such purpose following an A to D conversion and supply of the unfiltered analog input signal to the data processing system. Such filtering and software techniques would be well known to those in the art and need not be described in further detail. In FIG. 3 the conditioned signal is then further processed by the digital data processing system 17, as discussed below with reference to FIGS. 4–6 which depict flow charts helpful in describing the further data processing involved.

Figure 4:
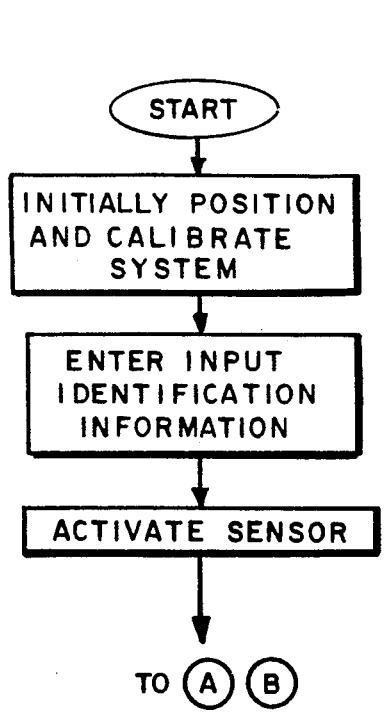
FIGS. 4, 5 and 6 show flow charts of the testing operation of the invention for use in the data processing system of FIG. 3.

As can be seen in FIG. 2, and in the flow chart of FIG. 4, the sensor is initially positioned adjacent the saw blade surface and appropriately calibrated so that, at a specified distance $d_o$ from the surface 14, the sensor's output voltage reference signal has a known reference value. Such reference voltage value represents the reference, or mean, distance $d_o$ from the sensor to the desired cutting plane of the saw during rotation at its normal operating speed, as designated by dashed line 18 in FIG. 2. Such initial positioning operation can be performed manually or it can be performed automatically using suitable electro-mechanical driver mechanisms therefor, as would be well within the skill of those in the art.

As shown in FIG. 4, once the sensor has been initially positioned, selected information concerning a particular saw under test (e.g., the manufacturer, the model number, size, serial number, etc.) can be entered into the processor so that the data resulting from the data analysis can be appropriately identifiable with the particular saw being tested.

Figure 5:
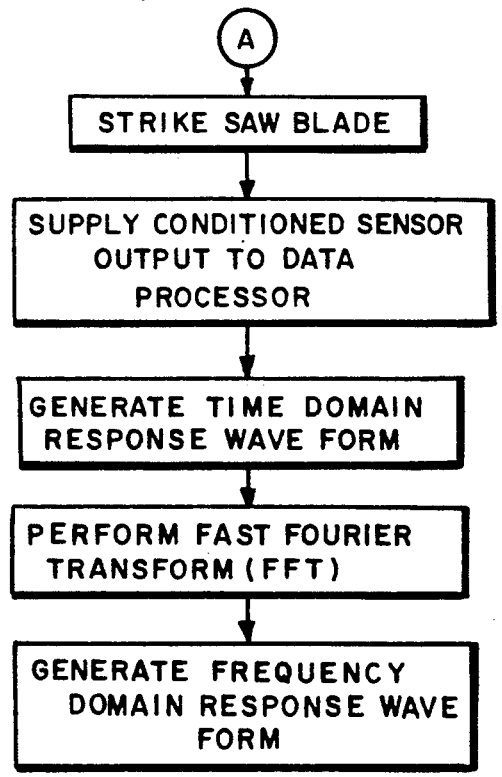

Once the initial positioning of the sensor is achieved, the sensor can be actuated and various tests can then be performed on the saw. A first test can be perfomed to determine the natural resonant frequency, or frequencies, of the saw blade, as shown in FIG. 5. In such test, with the saw at rest, the lateral surface 14 of the blade is struck with a suitable hammer-like device as to cause the blade to vibrate about the desired cutting plane. The natural vibrating frequencies of the saw blade can then be determined from an analysis of a frequency domain (frequency spectrum) response waveform of the output signal from the sensor, as shown in FIG. 5.

For such purpose, the digitized and conditioned time domain signal from the sensor is supplied to the data processing system 17 which generates a time domain response waveform which is then transformed from a time domain response waveform to a frequency domain response waveform by performing a suitable Fast Fourier Transform (FFT) operation thereon, such digital processing operation being one which is well known to those in the art. A frequency response waveform showing the frequency spectrum of the frequencies present in the sensed frequency domain response is thereby generated, from which spectrum the major natural frequencies of the blade can be determined.

Figure 6:
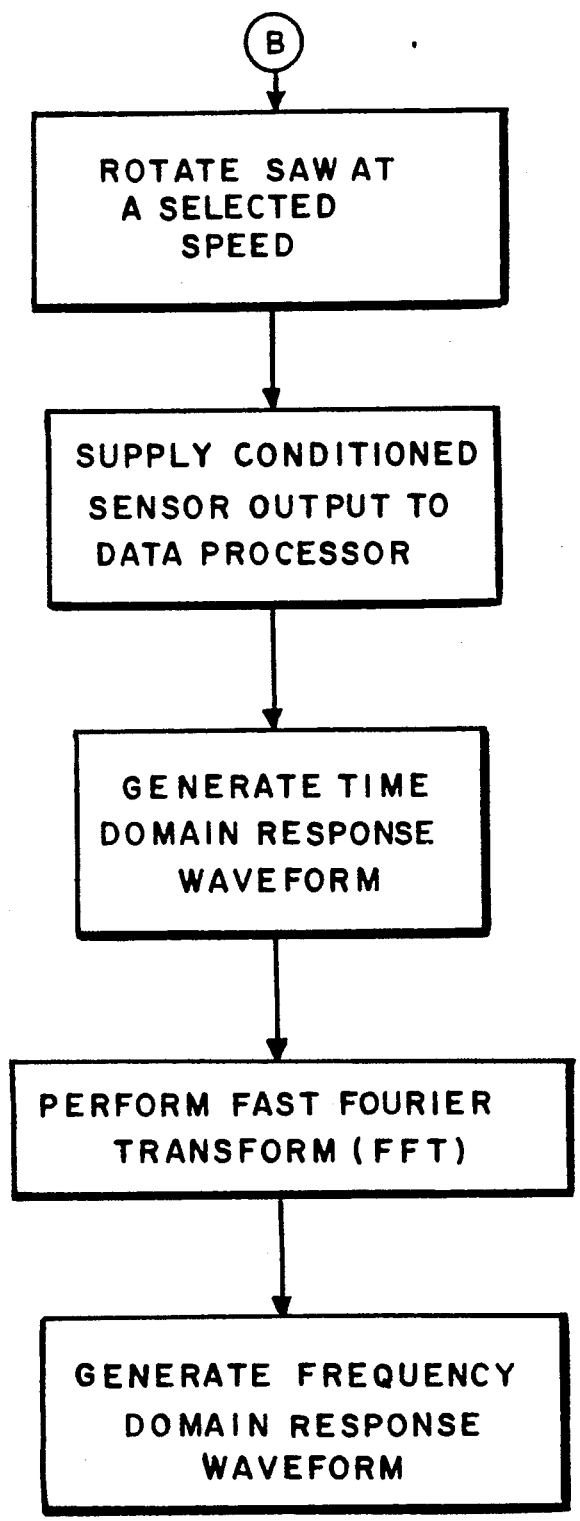
Figure 6A:
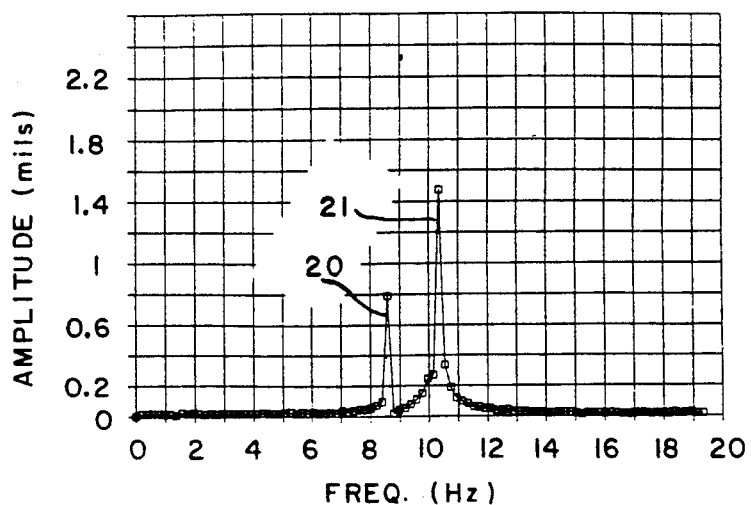
FIG. 6A shows a frequency domain response obtained for determining the natural frequency or frequencies of a saw blade in accordance with the invention.

An exemplary frequency spectrum produced by such a natural frequency check is shown in FIG. 6A which represents a typical portion of the spectrum at the lower end thereof below a selected frequency (e.g., below the cut-off frequency in the aforementioned low pass filtering operation). Such spectrum portion is obtained when a hammer, or similar striking device, is used to strike the blade 10 at a suitable point near its periphery. It has been found that, in general, no matter where on the saw blade surface the impact occurs, the natural frequencies detected are substantially the same, although their amplitudes may vary depending on where the blade is struck, how hard the impact is, etc. In the particular example depicted, natural resonant frequencies occur at about 8.5 Hz and about 10.5 Hz, as shown by voltage peaks 20 and 21, respectively. Saws having natural frequencies within a range from about 8.0 Hz to about 11.0 Hz have generally been found to be satisfactory for operation. The presence of natural frequencies outside such range but within the lower end of the spectrum depicted tends to indicate that a problem might arise during operation.

Next, an effective "static" test can then be made, i.e. one performed at a selected relatively low speed of rotation, well below the operating speed of the saw, e.g., at about 100 r.p.m. for a saw designed to operate at 650 r.p.m. Thus, as shown in FIG. 6, the saw is rotated at a selected speed, e.g., at a 100 r.p.m. speed for a static test operation. A time domain response waveform is generated from the conditioned sensor output supplied to the data processor and a fast Fourier transform (FFT) operation is performed thereon by the data processor to generate a frequency domain response waveform. Accordingly, both a frequency domain response waveform and a time domain response waveform are obtained at such rotating speed. The major frequencies present in the output signal can then be determined in the frequency domain response signal.

Figure 7:
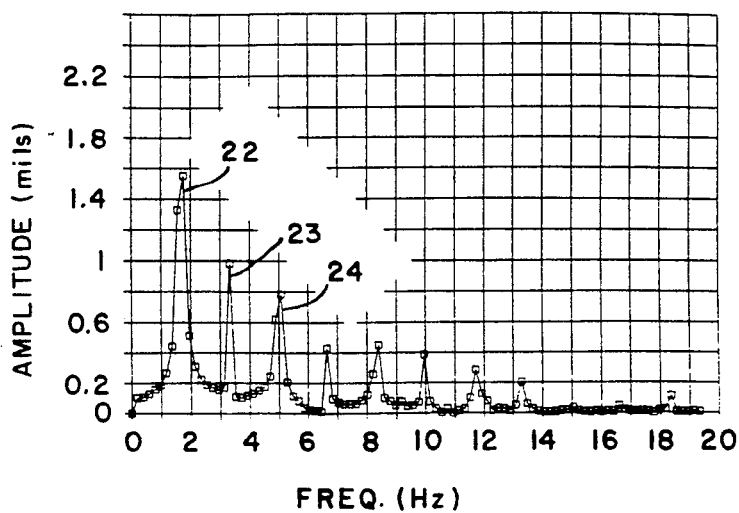
FIGS. 7 and 7A show frequency and time domain responses respectively obtained in a static check of a saw blade in accordance with the invention.
Figure 7A:
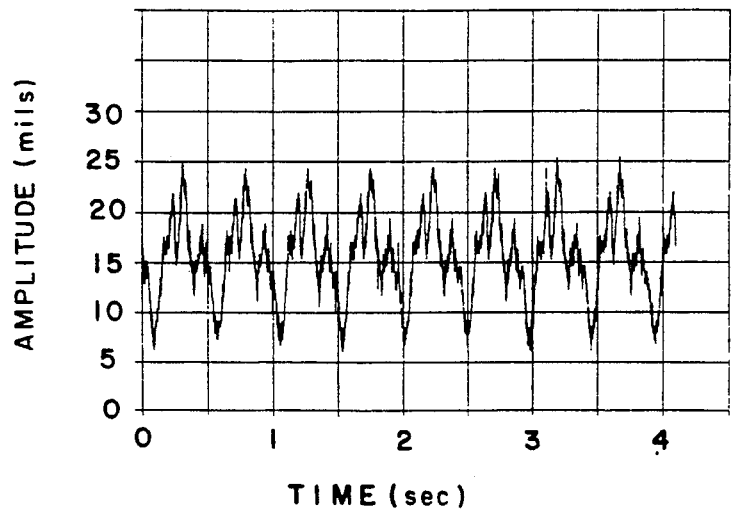

A typical example of such a static check is shown by the frequency domain response of FIG. 7 where it can be seen that the major frequencies at which significant amplitude peaks 22, 23 and 24 occur lie at about 1.75 Hz, 3.25 Hz, and 5.0 Hz. Other less significant peaks having lower amplitudes occur at other frequencies and tend to be of lesser importance. The corresponding time domain response is shown in FIG. 7A.

In such a static check, if a saw blade is perfectly flat and the center opening thereof by which the blade is mounted on a rotating spindle is perfectly formed so that the blade rotates in a cutting plane which is exactly perpendicular to the spindle axis of rotation, the frequency response would be essentially flat, i.e., there should be no peaks at any frequency in the overall frequency spectrum. The presence of a dominant peak at a frequency effectively corresponding to the rotating speed of the saw blade together with other less significant and relatively small peaks at other low frequencies tends to indicate that, while the saw blade may be reasonably flat, there may be a deviation from the exact perpendicularity to the spindle axis. The larger the dominant rotating speed peak the larger such deviation, while peaks below a reasonable level will normally indicate that the deviations will not be significant enough to adversely affect the operation of the blades at the normally used spindle speed. The presence of dominant peaks at frequencies other than the rotating speed tends to indicate that the surface at edge of the blade tends to deviate from a desired flatness.

It should be noted that such a static test will provide a rough idea of the saw blade's characteristics in these regards and are helpful in providing a preliminary evaluation of the operating characteristics of a saw blade, particularly when the above deviations are quite noticeable. However, such a test will not necessarily permit one accurately to predict the characteristics of the saw blade when running at its designed operating speed so that further tests are desirable in evaluating a saw blade's performance during use.

In connection with such further tests, it should be noted that substantially all saws tend to "cup" (i.e., they are not fully flat or fully developed) at relatively low speeds and it is desirable that such cupping characteristics be essentially symmetrical about the axis of rotation. As noted above, the presence of multiple frequency peaks at frequencies other than a peak corresponding to the rotating speed, as noted in the aforesaid frequency response static check, tends to indicate the degree to which such cupping is non-symmetric in nature. In summary, so long as the amplitudes of any dominant frequency component and any additional frequency components are sufficiently small, the non-perpendicularity of the cutting plane and the non-symmetric nature of the saw blade's cupping configuration should normally not present a problem during operation. Should any such amplitudes be too large, and particularly where peaks other than at the static test speed of rotation are larger than the spindle speed frequency peak, the static check may indicate that a problem might occur during operation at the saw's desired operating speed.

Figure 12:
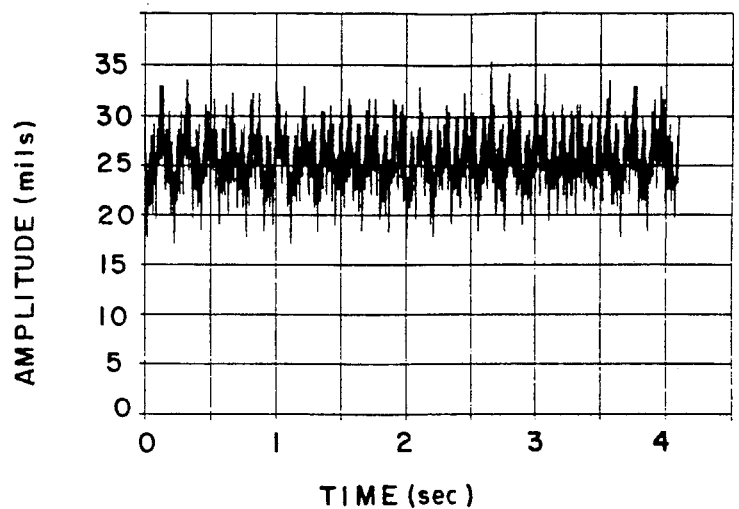
Figure 13:
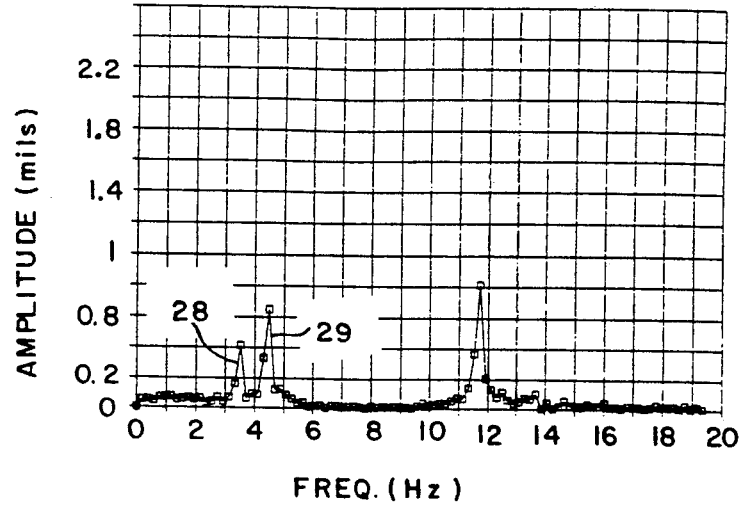

Once a preliminary static check is completed, dynamic tests can be made at several selected speeds of rotation. For such purpose, it is preferable that such dynamic tests be performed at the normal design operating speed of the saw blade, as well as at speeds both above and below such design operating speed, usually, for example, within about 10% or so of such normal operating speed. Thus, the spindle speed is suitably selected in each case and both time domain and frequency domain responses are obtained as discussed above with reference to FIG. 6. Exemplary time domain ("run-out") responses and corresponding frequency domain responses are shown in FIGS. 8–13 provided at a design operating speed of 650 r.p.m. (FIGS. 8 and 9) and at speeds below and above such operating speed, e.g., at 600 r.p.m. (FIGS. 10 and 11) and 700 r.p.m. (FIGS. 12 and 13).

Figure 8:
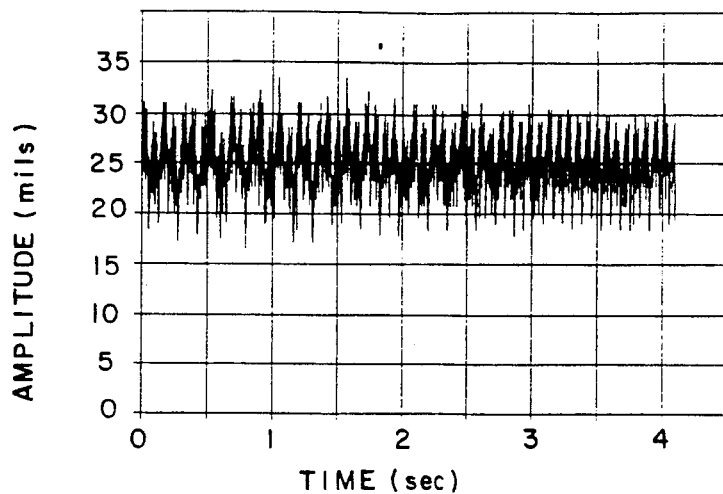
FIGS. 8–13 show time domain and frequency domain responses obtained during dynamic testing of a saw blade in accordance with the invention.
Figure 9:
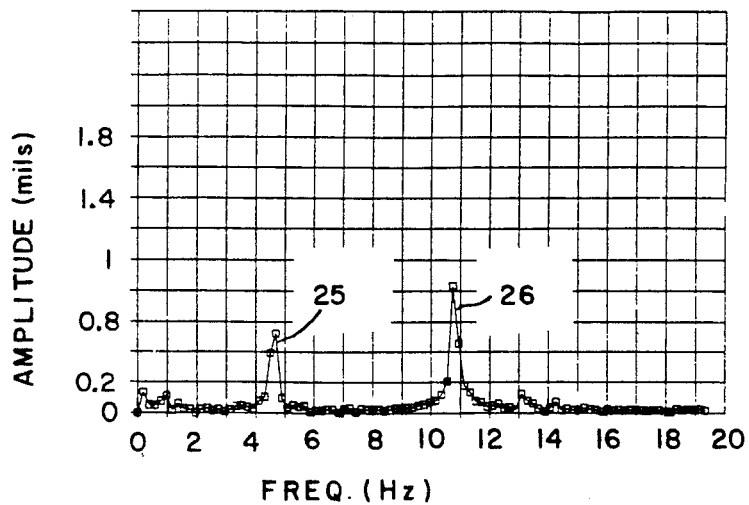

In FIG. 8, the time domain or run-out response shows an average lateral excursion of the saw blade, i.e., the peak-to-peak amplitude thereof, of less than 25 mils, while the frequency domain response in FIG. 9 shows the presence of a single significant low frequency component 25 at about 4.8 Hz. (a "wobble" frequency) below the spindle frequency component 26, the wobble frequency having an amplitude of about 0.55 mils. So long as the peak amplitude of the wobble frequency component 25 in the low end of the spectrum is relatively small, e.g., less than 1.0 mil, the wobble should not represent a problem during operation. Further, so long as the peak-to-peak excursion is relatively low, the width of the cut should generally be satisfactory. Any wobble peaks that might occur at the high end of the spectrum, e.g., well above the spindle frequency component (such peaks would not appear in the frequency range shown in FIG. 9), do not normally adversely affect the operation of the saw blade at its operating speed.

Figure 10:
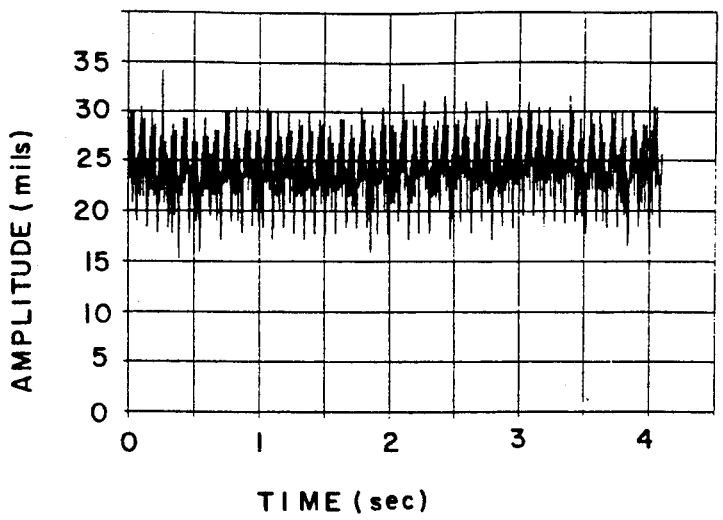
Figure 11:
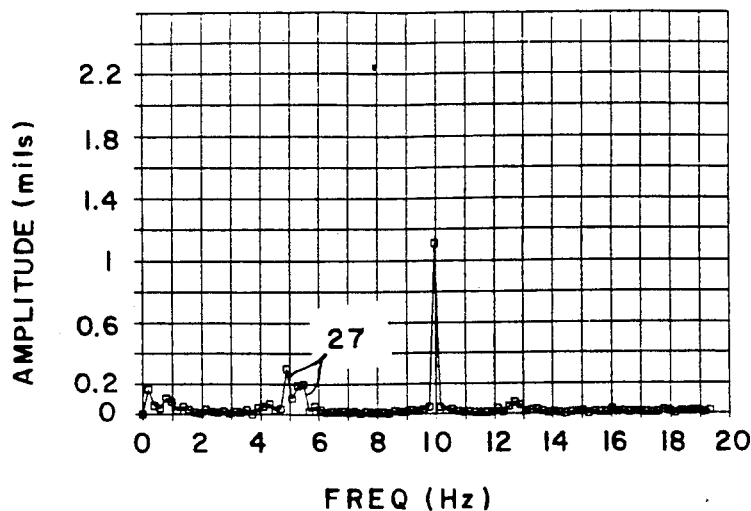

In FIG. 10, the average lateral excursion amplitude at 600 r.p.m. is also about 25 mils, while a "wobble" frequency component 27 occurs in the low end of the spectrum at about 5.0 Hz (FIG. 11), the wobble having an amplitude below that shown in FIG. 9 for the wobble frequency at 650 r.p.m., indicating that, if the saw blade slows down somewhat during operation, no significant wobble occurs to adversely affect the operation thereof during use.

At 700 r.p.m., the average run-out excursion amplitude is also about 25 mils (FIG. 12) and two low frequency wobble components 28 and 29 occur at about 3.5 Hz and 4.5 Hz (FIG. 13), the wobbles in each case having peaks well below 1.0 mil., indicating that if the blade speeds up during operation no significant wobble will occur to adversely affect such operation.

A further characteristic that can be determined from the dynamic time domain response shown in FIGS. 8, 10 and 12 relates to the saw's "development," that is, the degree of curvature of the overall saw blade that might exist to cause the blade to depart from the desired cutting plane during operation. As the rotating speed of the saw is increased up to the saw's normal operating speed, a saw should "develop" to its desired degree of flatness.

Thus, at the relatively low rotation speed, such as shown in FIG. 7A (e.g. 100 r.p.m.), the average or mean lateral excursion amplitude is about 15 mils. At a normal operating speed of 650 r.p.m., however, the mean excursion value has increased to about 25 mils, as seen in FIG. 8, showing that the saw blade has flattened, or developed, in comparison with its configuration at the lower speed. FIGS. 10 and 12 illustrate that such average excursion amplitudes at 600 r.p.m. and 700 r.p.m. are substantially the same as that at 650 r.p.m. indicating that the blade under test has effectively achieved its full development when it reaches its normal speed, the blade remaining fully developed even should its operating speed decrease or increase somewhat above or below the normal operating speed.

The total excursion at the saw's desired operating speed should lie within reasonable limits so that the width of the cut made by the saw is relatively narrow. Further, the amplitude of the saw's wobble frequency, or frequencies, should lie below a reasonable level to assure that the deviation of the cut from a desired cutting plane is relatively small. In the examples shown in FIGS. 8 and 9, an excursion of 25 mils and a wobble amplitude of less than 1.0 mil are generally satisfactory for most applications.

What is claimed is:

1. A method for testing selected characteristics of circular saws comprising the steps of
    mounting a circular saw for rotation at a controllable speed of rotation;
    positioning a sensor opposite a surface of said saw, an output signal from said sensor representing the distance from said sensor to said surface;
    calibrating said sensor to produce a known sensor output at a selected known reference distance from said sensor to said surface;
    rotating said saw at a selected speed of rotation;
    responding to said sensor output signal at said selected speed of said rotation to provide a time domain response of said sensor output signal;
    responding to said time domain response to provide a frequency domain response of said sensor output signal;
    determining, from said frequency domain response and said time domain response, selected characteristics of said saw at said selected speed of rotation.

2. A method in accordance with claim 1 further including the steps of striking the lateral surface of said saw, when said saw is not rotating, and thereby causing said saw to vibrate;
    determining, from the frequency domain response, one or more natural vibrating frequencies of said saw.

3. A method in accordance with claim 1 wherein said saw is rotated at a speed of rotation substantially below a desired operating speed of rotation of said saw wherein said determining step includes determining, from said frequency domain response, the amplitudes of relatively low frequency components present therein.

4. A method in accordance with claim 1 wherein said saw is rotated at a desired operating speed of rotation wherein said determining step includes determining, from said frequency domain response, the amplitudes of frequency components present therein having frequencies below that of a frequency component related to said operating speed so as to determine the presence of wobble in said saw's operation.

5. A method in accordance with claim 4 and further including the step of determining, from said time domain response, the peak-to-peak excursion of said saw at said operating speed so as to determine the dynamic cutting width of said saw at said operating speed.

6. A method in accordance with claim 5 and further including the step of further determining, from said time domain response, the average excursion of said saw so as to determine the development of said saw at said operating speed.

7. A method in accordance with claim 4 wherein said saw is further rotated at speeds of rotation above and below said desired operating speed of rotation thereof and said determining step further includes
    determining, from said time domain responses, the average excursion of said saw at said speeds above and below said operating speed so as to determine the development of said saw above and below said operating speed.

8. A method in accordance with claim 7 and further including
    determining, from said time domain response, the peak-to-peak excursion of said saw at said speeds above and below said operating speed so as to determine the dynamic cutting width of said saw at said speeds above and below said operating speed.

* * * * *